US010725661B2

(12) United States Patent
Khandelwal et al.

(10) Patent No.: US 10,725,661 B2
(45) Date of Patent: Jul. 28, 2020

(54) SELECTIVE WRITE CONTROL

(71) Applicant: INTERNATIONAL BUSINESS MACHINES CORPORATION, Armonk, NY (US)

(72) Inventors: Nikhil Khandelwal, Tucson, AZ (US); Gregory E. McBride, Vail, AZ (US); David C. Reed, Tucson, AZ (US); Richard A. Welp, Manchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 10 days.

(21) Appl. No.: 15/676,971

(22) Filed: Aug. 14, 2017

(65) Prior Publication Data
US 2018/0011634 A1    Jan. 11, 2018

Related U.S. Application Data

(63) Continuation of application No. 14/754,122, filed on Jun. 29, 2015, now Pat. No. 9,785,354.

(51) Int. Cl.
G06F 3/06    (2006.01)

(52) U.S. Cl.
CPC .............. *G06F 3/061* (2013.01); *G06F 3/065* (2013.01); *G06F 3/0614* (2013.01);
(Continued)

(58) Field of Classification Search
CPC ...... G06F 3/061; G06F 3/0689; G06F 3/0614; G06F 3/0665; G06F 3/0659; G06F 3/065; G06F 3/0673
See application file for complete search history.

(56) References Cited

U.S. PATENT DOCUMENTS 7,293,009 B2    11/2007  Jacobs et al.
7,587,563 B1     9/2009  Teterin et al.
(Continued)

OTHER PUBLICATIONS

"What is a VTOC", IBM Knowledge Center, [online][initially retrieved Apr. 29, 2015], p. 1, http://www-01.ibm.com/support/knowledgecenter/zosbasics/com.ibm.zos.zconcepts/zconcepts_171.htm.
"VSAM Demystified", IBM Redbooks, [online][retrieved Apr. 29, 2015], pp. 2, http://www.redbooks.imb.com/abstracts/sg246105.html.
"Direct-access storage device", Wikipedia, [online][retrieved Apr. 29, 2015], pp. 3, http://en.wikipedia.org/wiki/Direct-access_storage_device.
(Continued)

*Primary Examiner* — Michael Krofcheck
(74) *Attorney, Agent, or Firm* — William K. Konrad; Konrad Raynes Davda & Victor LLP

(57)    ABSTRACT

Provided are a computer program product, system, and method for selective write control in accordance with the present description. In one aspect, a write operation which is associated with a read operation, may be selectively discarded if write operations have been disabled and if the write operation is directed to update a designated write operation acceptance area such as metadata associated with the target data set, for example. As a result, the read operation may be permitted to proceed and will not fail because the associated write operation was discarded rather than attempting to commit the write operation to the designated write operation acceptance area, thereby avoiding an error condition for a storage unit such as a volume, in which write operations have been disabled. Accordingly, applications which seek to perform read operations may be permitted to access data stored on such a volume. Other aspects are described.

24 Claims, 7 Drawing Sheets

(52) U.S. Cl.
CPC .......... *G06F 3/0659* (2013.01); *G06F 3/0665* (2013.01); *G06F 3/0689* (2013.01)

(56) References Cited

U.S. PATENT DOCUMENTS

| | | | |
|---|---|---|---|
| 8,416,954 B1 | 4/2013 | Raizen et al. | |
| 8,799,222 B2 | 8/2014 | Marathe et al. | |
| 2006/0047920 A1* | 3/2006 | Moore | G06F 3/0607 711/154 |
| 2006/0265756 A1* | 11/2006 | Campbell | G06F 21/50 726/26 |
| 2007/0186070 A1* | 8/2007 | Federa | G06F 12/1425 711/163 |
| 2011/0113065 A1 | 5/2011 | Cupka et al. | |
| 2013/0103650 A1* | 4/2013 | Natanzon | G06F 11/2069 707/684 |
| 2014/0310800 A1* | 10/2014 | Kabra | G06F 21/552 726/17 |

OTHER PUBLICATIONS

"Virtual Sorage Access Method", Wikipedia, [online][retrieved Apr. 29, 2015], pp. 4, http://en.wikipedia.org/wiki/Virtual_Storage_Access_Method.

"Volume table of contents", Wikipedia, [online][retrieved Apr. 29, 2015], pp. 3, http://en.wikipedia.org/wiki/Volume_table_of_contents.

U.S. Appl. No. 14/754,122, filed Jun. 29, 2015, (18.572).

Office Action dated Jan. 27, 2017, pp. 13, for U.S. Appl. No. 14/754,122, filed Jun. 29, 2015, (18.572).

Amendment dated Apr. 27, 2017, pp. 13, to Office Action dated Jan. 27, 2017, pp. 13, for U.S. Appl. No. 14/754,122, filed Jun. 29, 2015, (18.572).

Notice of Allowance dated Jun. 5, 2017, pp. 13, for U.S. Appl. No. 14/754,122, filed Jun. 29, 2015, (18.572).

List of IBM Patents or Patent Applications Treated as Related, dated Aug. 14, 2017, pp. 2.

* cited by examiner

SELECTIVE WRITE CONTROL

BACKGROUND OF THE INVENTION

1. Field of the Invention

The present invention relates to a computer program product, system, and method for facilitating read operations in a volume.

2. Description of the Related Art

In certain computing environments, multiple host systems may configure data sets in volumes configured in a storage system, such as interconnected storage devices, e.g., a Direct Access Storage Device (DASD), Redundant Array of Independent Disks (RAID), Just a Bunch of Disks (JBOD), etc. Data sets are comprised of extents, which may comprise any grouping of tracks and data storage units. The Z/OS® operating system from International Business Machines Corporation ("IBM") has a Volume Table of Contents (VTOC) to provide information on data sets of extents configured in the volume, where the VTOC indicates the location of tracks, extents, and data sets for a volume in storage.

To avoid loss of data, data stored on a volume (often referred to as a primary volume) may be backed up by copying it to another volume (often referred to a secondary volume) frequently stored at another geographical location. Accordingly, in the event that data on the primary volume is lost due to data corruption, hardware or software failure, or a disaster which destroys or damages the primary volume, the backup data may be retrieved from the secondary volume.

To preserve the backup data on the secondary volume until it is needed, in some environments, both read and write operations directed to the secondary volume may be disabled. For example, in some operating systems, a read operation directed to a volume causes the operating system to generate an associated write operation as well. For example, if a particular data set is to be read, a "last referenced date" field of the VTOC may updated by the operating system to indicate when that data set was last accessed. Accordingly, if write operations for a secondary volume are disabled to preserve the integrity of the data stored on the secondary volume, a read operation will frequently fail as well since the read operation causes the operating system to attempt to write data to the secondary volume. As a result, read operations are frequently disabled as well as write operations, to prevent all attempts to change the data stored on the secondary volume. Thus, applications which seek to perform read operations only may also be prevented from accessing the data stored on the secondary volume.

One approach to permitting read operations is to create an unmodified clone of the original file if the file is modified. The modified file and the unmodified clone may be stored separately. Another approach is use a database to keep track of modified file versions.

SUMMARY

Provided are a computer program product, system, and method for facilitating read operations received from a host, and directed to reading target data from a read target area of a storage unit coupled to a storage controller in which write operations to the storage unit have been disabled. In one embodiment, if a write target area of a write operation associated with a read operation is determined to be within a designated write operation acceptance area of the storage unit, the associated write operation is accepted. However, the accepted write operation is discarded to prevent the write target data from being committed to the write target area. In this manner, the read target data may be read from the storage unit unimpeded by an associated write operation if write operations have been disabled.

DETAILED DESCRIPTION

Figure 1A:
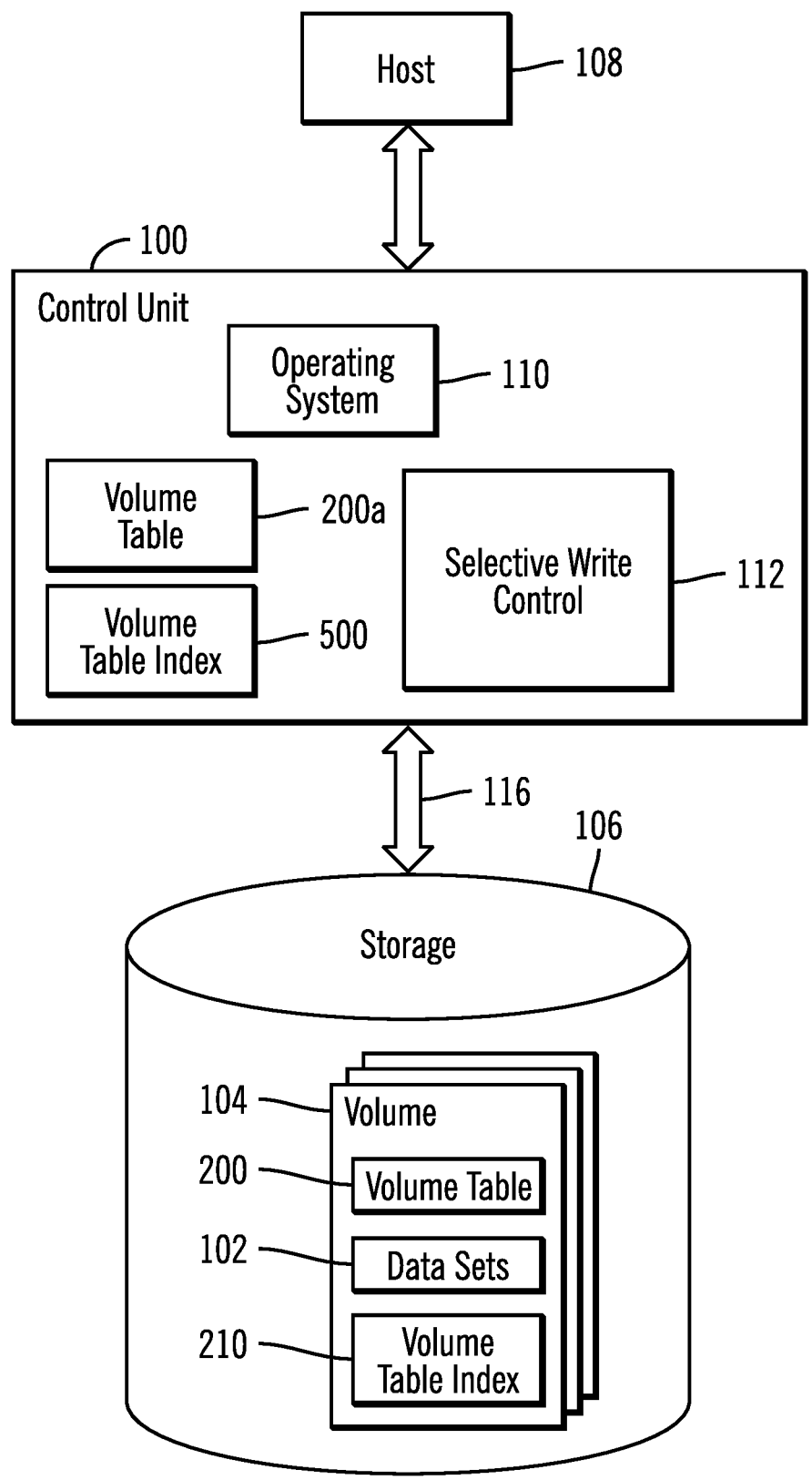
FIG. 1A illustrates an embodiment of a storage environment, employing aspects of selective write control in accordance with the present description.

Described embodiments provide techniques for facilitating read operations by selective write operation control in a storage unit such as a volume in which write operations have been disabled. Absent selective write control in accordance with the present description, a read operation directed to a volume in which write operations have been disabled, may fail.

For example, in some operating systems, if a particular data set is read, a "last referenced date" field of the VTOC may be updated by the operating system to indicate when the target data set was last accessed. Another example is the open indicator field of metadata for Virtual Storage Access Method (VSAM) Volume Data Set (VVDS).

Accordingly, if write operations for a secondary volume are disabled to preserve the integrity of the data stored on the secondary volume, absent selective write control in accordance with the present description, a read operation will frequently fail since the read operation causes the operating system to attempt to write data to the secondary volume.

In one aspect of selective write control in accordance with the present description, a write operation which is associated with a read operation, may be selectively discarded if the write operation is directed to update a designated write operation acceptance area such as metadata associated with the target data set, for example. As a result, the read operation may be permitted to proceed and will not fail because the associated write operation was discarded rather than attempting to commit the write operation to the volume, thereby avoiding an error condition for a volume in which write operations have been disabled. Accordingly, applications which seek to perform read operations may be permitted to access data stored on such a volume.

Accordingly, in one embodiment, a determination may be made as to whether a write operation pertains only to a particular designated area such as the metadata of a target data set, for example. If so, and if the write operation was caused by a read access requested by an application targeting the data set, the write operation associated with the requested read operation may be discarded. Consequently, an error message is not generated by a prohibited write operation because the prohibited write operation was discarded rather than proceeding with an attempt to commit the write operation to the target volume.

As a result, in some embodiments, the application may not be notified of an error condition because the error condition is avoided. For example, the source of the read operations or the associated write operations need not be notified of the discarding of the write operation since the discarded write operation pertained to metadata of a volume disabled for write operations. Further, the data set is opened for the read operation which is allowed to progress unhindered by a prohibited write operation. In this manner, a read operation may be facilitated for volumes such as a secondary volumes in a mirrored relationship in which write operations to the secondary volume have been disabled to preserve the data integrity of the secondary volume. Conversely, if an unexpected attempt is made to write to another area of the volume such as to an actual data set rather than to metadata of a designated write operation acceptance area, selective write control in one embodiment may cause that write operation to fail, and to report an error back to the user or application.

Accordingly, selective write control in accordance with one aspect of the present description includes determining areas of a volume and designating them for accepting write operations directed to those designated areas, even if write operations to the volume have been disabled. Although the write operation directed to the designated area is accepted by the selective write control, the write operation is discarded, rather than being committed to the designated areas, if write operations have been disabled for the volume. Examples of areas which may be designated as write operation acceptance areas notwithstanding write operation disablement, include the Volume Table of Contents (VTOC) and the Virtual Storage Access Method (VSAM) Volume Data Set (VVDS). Accordingly, write operations directed to these designated areas may be accepted by the selective write control, and a return message may be generated and returned to the operating system indicating successful conclusion of the write operation notwithstanding that the write operations was discarded rather than being committed to write data to the volume.

If write operations are enabled rather than disabled, an accepted write operation is committed to the volume so that the write data is stored in the target volume. Conversely if a write operation targets an area outside the area designated for write operation acceptance, and if write operations have been disabled, the write operation is not accepted by the selective write control and an error message is generated and returned to the source of the write operation which is typically the operating system. Accordingly, write operations targeting tracks of a volume that have not been designated for write operation acceptance, will be failed by the selective write control to preserve the integrity of the volume.

FIG. 1A illustrates an embodiment of a computing environment including a control unit 100, such as a storage controller or server, that manages access to data sets 102 configured in volumes 104 in a storage 106 by one or more hosts as represented by a host 108 (FIG. 1A). The control unit 100 may be a primary storage controller 100a (FIG. 1B) for a primary storage 106a similar to the storage 106 (FIG. 1A), or may be a secondary storage controller 100b for a secondary storage 106b similar to the storage 106 (FIG. 1A). The volumes 104 (FIG. 1A) of the storages 106a, 106b (FIG. 1A) may be in a peer-to-peer mirror relationship such that data written to one volume, typically a primary volume in the primary storage 106a, is mirrored to a corresponding secondary volume in the secondary storage 106b such that the secondary volume is a copy of the primary volume. The source of the data written to the volumes is typically one or more of the hosts 108. It is appreciated that selective write control in accordance with the present description is applicable to other types of storage units in addition to volumes in a mirrored, peer-to-peer relationship. For example, selective write control in accordance with the present description is applicable to storage units in which read operations are permitted but write operations to the storage units have been disabled for a variety of reasons.

A data set 102 (FIG. 1A) comprises a collection of data intended to be stored in a logical allocation of data, such as data from a single application, user, enterprise, etc. A data set 102 may be comprised of separate files or records, or comprise a single file or record. Each record or file in the data set 102 may be comprised of extents of data.

The control unit 100 includes an operating system 110 and selective write operation control logic 112 to manage the storage of data sets 102 in the volumes 104 in accordance with the present description. The operating system 110 may comprise the IBM z/OS® operating system or other operating systems for managing data sets in volumes or other logical data structures. (IBM and z/OS are trademarks of IBM worldwide). The selective write operation control logic 112 may be separate from the operating system 110 or may be included within the operating system. The selective write operation control logic may be implemented with hardware, software, firmware or any combination thereof.

Each volume 104 includes metadata concerning the data sets 102 such as a volume table 200 having information on the volume 104 to which it pertains, including a mapping of tracks and extents of tracks to data sets 102. The volume table 200 may be stored in the volume 104, such as in the first few records of the volume, i.e., starting at the first track in the volume 104. In IBM z/OS operating system implementations, the volume table 200 may comprise a volume table of contents (VTOC). In other embodiments, the volume metadata may include a Virtual Storage Access Method (VSAM) Volume Data Set (VVDS). In one embodiment, the volume tables 200 may comprise contiguous space data sets having contiguous tracks or physical addresses in the storage 106. In alternative embodiments, the volume table 200 may comprise a file allocation table stored separately from the volume 104 or within the volume 104. It is appreciated that volume metadata may include metadata in other formats describing various aspects of the data sets 102 of the volume.

The control unit 100 may maintain copies of the volume tables 200 to use to manage the data sets 102 in the volumes 104. In z/OS implementations, the volume table 200, e.g., VTOC, may include information on locations of data sets in the volume 104, such as a mapping of tracks in the data sets to storage locations in the volume. In some embodiments, the volume metadata may include fields containing data such as last referenced data identifying the last time a particular data set was accessed. In alternative embodiments, the volume table 200 may comprise other types of file allocation data structures that provide a mapping of data to storage locations, either logical and/or physical storage locations. In this way, the volume table 200 provides a mapping of tracks to data sets 102 in the volume 104. In further embodiments, the volume table 200 may include a volume name and data set records indicating data sets having extents configured in the volume 104. Each data set record may have information for each data set 102 in a volume 104, including the data units (e.g., tracks, blocks, etc.) assigned to the data set 102. Tracks may be stored in extents, which provide a mapping or grouping of tracks in the volume 102. The volume 104 may further include a volume table index 210 that maps data set names to data set records in the volume table 200.

The storage 106 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

Figure 1B:
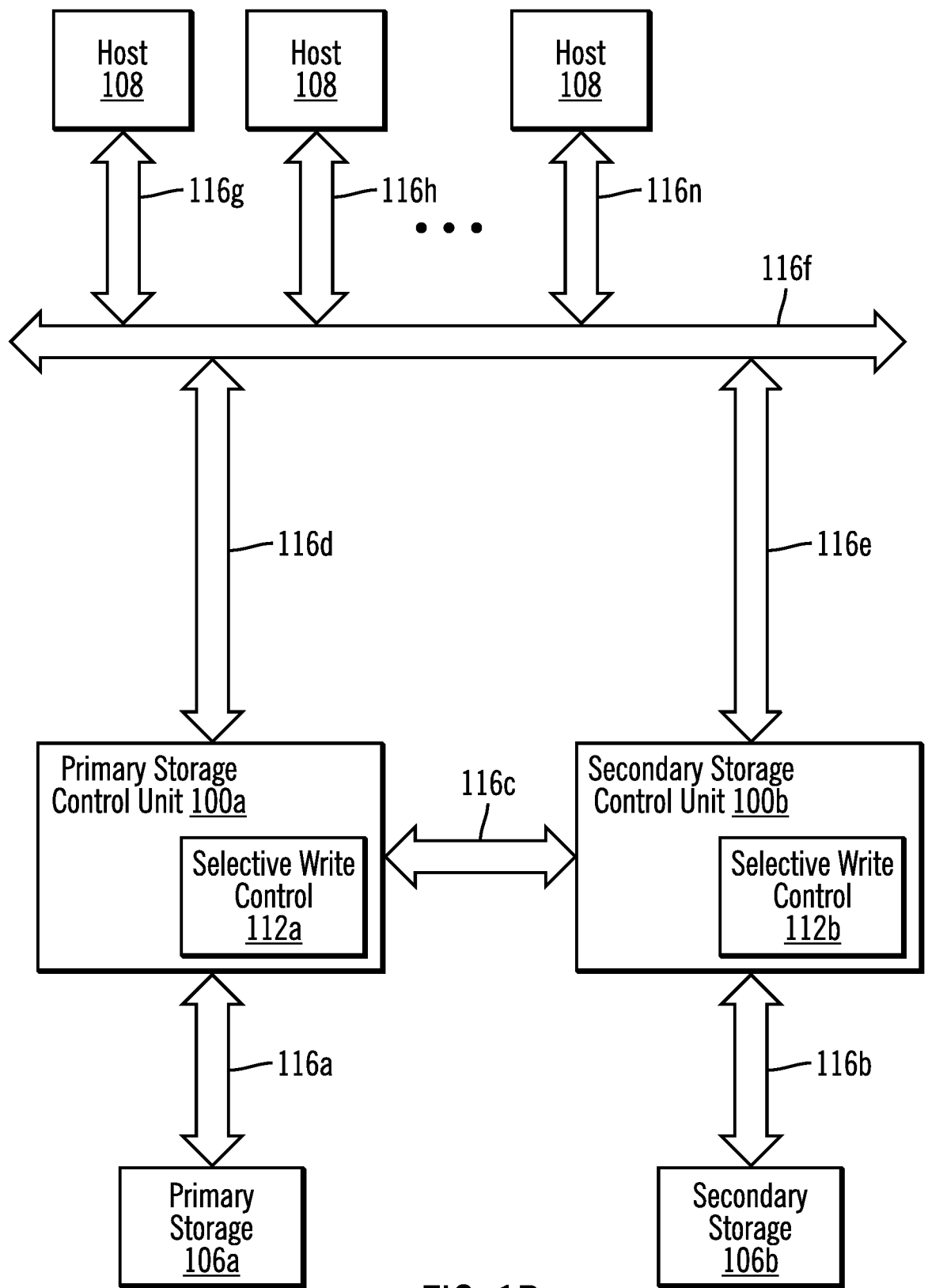
FIG. 1B illustrates another embodiment of a storage environment, employing aspects of selective write control in accordance with the present description.

The control unit 100 communicates with the storage 106 via connection 116. The components of the embodiment depicted in FIG. 1B are similarly interconnected by connections 116a, 116 b . . . 116n. The connections 116, 116a, 116 b . . . 116n each may comprise one or more networks, such as a Local Area Network (LAN), Storage Area Network (SAN), Wide Area Network (WAN), peer-to-peer network, wireless network, etc. Alternatively, the connections 116, 116a, 116 b . . . 116n may comprise bus interfaces, such as a Peripheral Component Interconnect (PCI) bus or serial interface.

Figure 2:
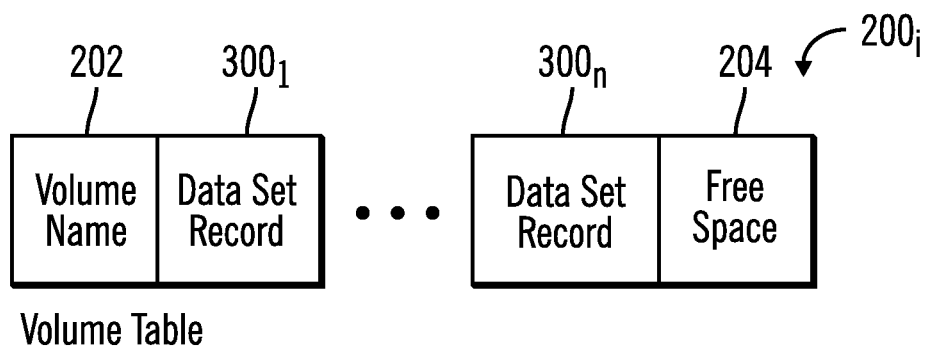
FIG. 2 illustrates an embodiment of a volume table.

FIG. 2 illustrates an arrangement of information maintained in an instance of a volume table $200_i$ for one volume $104k$. The volume table instance $200_i$ includes a volume name 202, also known as a volume serial number, e.g., a VOLSER, that provides a unique identifier of the volume. The volume name 202 may be included in the name of the volume table $200_i$ in the volume $104_i$. The volume table $200_i$ instance further includes one or more data set records $300_i$ . . . $300n$ indicating data sets having extents of tracks configured in the volume $104_i$ represented by the volume table $200_i$. The volume table $200_i$ further includes one or more free space records 204 identifying ranges of available tracks in the volume $200_i$ in which additional data set records $300_{n+1}$ can be configured. In embodiments where the operating system 110 comprises operating systems such as the Z/OS operating system, the data set records may comprise data set control blocks.

Figure 3:
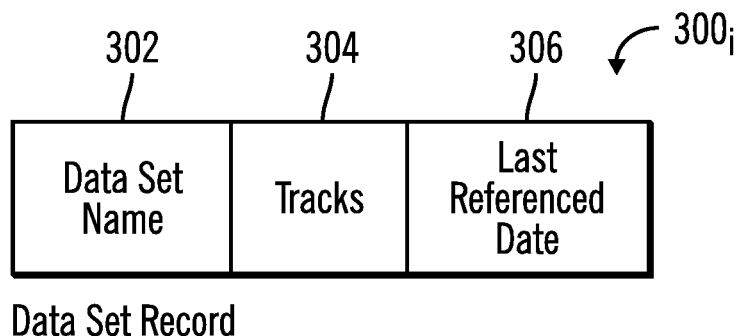
FIG. 3 illustrates an embodiment of a data set record.

FIG. 3 illustrates an embodiment of an instance of a data set record $300_i$, such as one of the data set records $300_i$ . . . $300n$ included in the volume table $200k$. Each data set record $300_i$ contains metadata 302, 304, 306 pertaining to a particular data set 102 (FIG. 1A). In one embodiment, the metadata may be arranged in fields including for example, a field 302 identifying a name for the particular data set, one or more fields 304 identifying the locations of the tracks allocated to the data set of the record $300_i$, and one or more fields 306 identifying the date and time the data set of the record $300_i$ was last referenced or accessed. It is appreciated that the metadata describing various aspects of the data set of the record $300_i$ may include other fields, depending upon the particular application. The track location information 304 may be expressed as disk, cylinder, head and record location (CCHHR), or other formats. Terms such as tracks, data units, blocks, etc., may be used interchangeably to refer to a unit of data managed in the volume 104.

The volume table 200 may be located at track 0 and cylinder 0 of the volume 104. Alternatively, the volume table 200 may be located at a different track and cylinder number than the first one.

Figure 4:
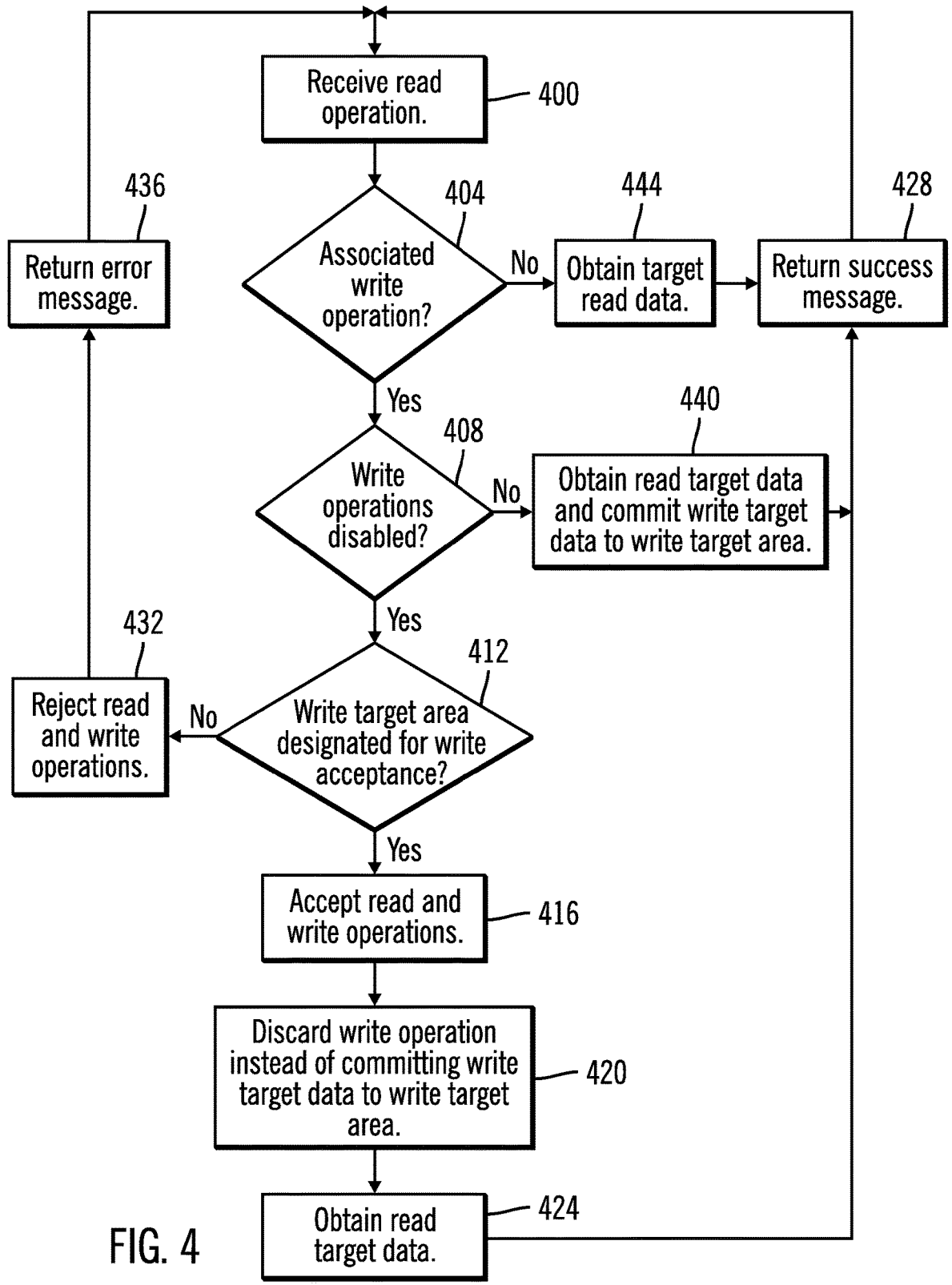
FIG. 4 illustrates an embodiment of operations of a storage control unit employing selective write control in accordance with the present description.

FIG. 4 illustrates an embodiment of operations performed by a selective write control logic such as a selective control logic 112, 112a, 112b (FIGS. 1A, 1B) in accordance with the present description, in which a write operation associated with a read operation, may be selectively discarded if the write operation is directed to update data such as metadata associated with a target data set of the read operation, for example. As a result, the read operation may be permitted to proceed and will not fail because the associated write operation was discarded rather than an attempt being made to commit the write operation to the volume, thereby avoiding an error condition for a volume in which write operations have been disabled. Accordingly, applications which seek to perform read operations may be permitted to access data stored on such a volume.

In this example, a storage controller such as the control unit or storage controller 100 (FIG. 1A) for example, may receive (block 400) from a host such as a host 108 (FIG. 1A) for example, a read operation directed to reading target data from a read target area of a storage unit such as a volume 104 coupled to the storage controller. A determination (block 404) is made as to whether a write operation is associated with the requested read operation. For example, as noted above, in some storage systems, when a particular data set is accessed, a write operation may be generated by the operating system or other control logic to update a field in the metadata for that data set 102, to indicate the date and time the data set was last referenced or accessed. It is appreciated that there may be other types of write operations associated with a requested read operation.

If it is determined (block 404) that a write operation is associated with the requested read operation, another determination (block 408) may be made as to whether write operations have been disabled for the target volume or other storage unit which is the target of the associated write operation. If write operations have been disabled for the target storage unit, a determination (block 412) is made as to whether the write target area targeted by the associated write operation within the target storage unit has been designated for write operation acceptance. One example of an area which may be designated for write operation acceptance is a last date/time referenced field within a VTOC or other metadata.

If it is determined (block 412) that the write target area targeted by the associated write operation within the target storage unit is within the area designated for write operation acceptance, both the requested read operation and its associated write operation are accepted (block 416) by the storage control unit. However, rather than committing the write target data to the write target area of the accepted write operation, the write operation is discarded (block 420).

It is appreciated that an attempt to commit the write target data to the write target area may cause an error condition since write operations were determined to be disabled (block 408) for this particular storage unit. Such an error condition may cause the associated read operation to fail as well as the associated write operation. Thus, in the example where the read target data is a data set and the write target data of the associated write operation is directed to updating a last referenced date field of the metadata for the read target data set of the read operation, the discarding of the write operation prevents an attempt to update the last referenced date field for the read target data set of the read operation, which attempt would have caused an error condition which may have in turn caused the requested read operation to fail.

However, since the associated write operation is discarded (block 420) rather than committed, the error condition is avoided and the read operation may proceed (block 424) to obtain the requested read target data unhindered by the associated write operation which was discarded. Accordingly, a message may be returned (block 428) to the source of the read operation indicating that the read operation was successful. In some embodiments, such a message may also indicate that the write operation was successful in that the write operation was accepted although the target write data was not actually committed to the write target area. Such a write operation successful message may be appropriate in circumstances such as those where the write operation was not an important aspect of the overall operation which included the requested read operation and the return of a successful message is needed to avoid an abort or other result which may be undesirable for the read operation to be successful. Thus, in this manner, a message that the write operation was successful may be issued instead of issuing an error message in response to the associated write operation, which might have caused the read operation to fail.

If it is determined (block 412) that the write target area targeted by the associated write operation within the target storage unit is not within the area designated for write operation acceptance, both the requested read operation and its associated write operation are rejected (block 432) by the storage control unit. Accordingly, the write target data is not committed to the write target area of the accepted write operation and the read target data is not obtained since the associated write operation if committed would have attempted to write to an area outside the designated write operation acceptance area for a storage unit in which write operations have been disabled (block 408). An error message may be returned (block 436) indicating that the read and write operations failed.

If it is determined (block 404) that there is no write operation associated with the requested read operation, the read operation may proceed (block 444) to obtain the requested read target data since there is no associated write operation which if present might have attempted to write where write operations had been disabled (block 408). Accordingly, a message may be returned (block 428) to the source of the read operation indicating that the read operation was successful.

If it is determined (block 404) that there is a write operation associated with the requested read operation, and if it is determined (block 408) that write operations have not been disabled, the read operation may proceed (block 440) to obtain the requested read target data. In addition, the associated write operation may proceed (block 440) since it was determined (block 408) that write operations have not been disabled. Accordingly, a message may be returned (block 428) to the source of the read operation indicating that the read operation and the associated write operation was successful.

Figure 5:
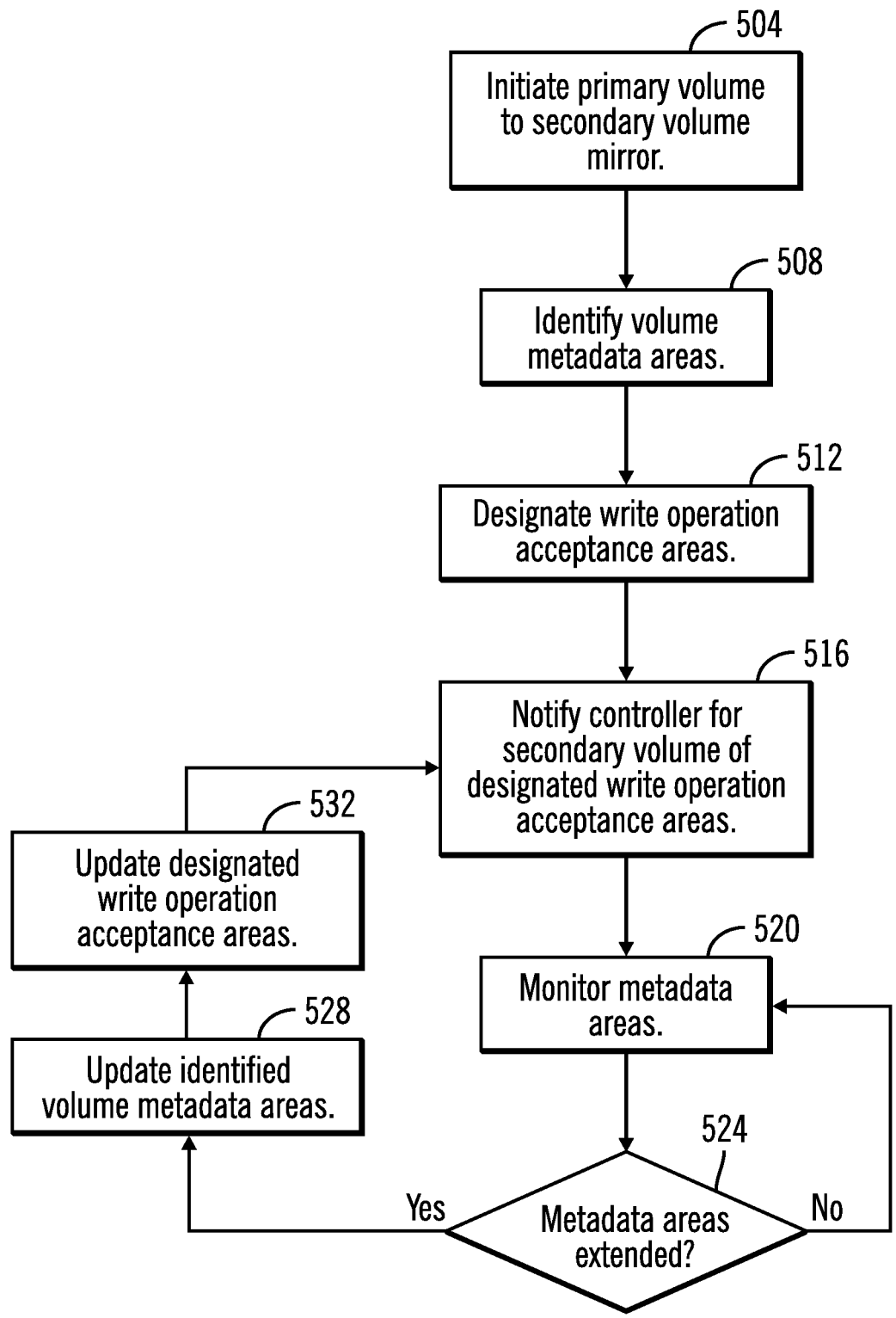
FIG. 5 illustrates another embodiment of operations of a storage control unit employing selective write control in accordance with the present description.

FIG. 5 illustrates another embodiment of operations performed by a selective write control logic 112a (FIG. 1B) in accordance with the present description. In this embodiment, a write operation acceptance area is designated in connection with operations of a primary storage controller such as the primary storage control unit 100a (FIG. 1B) which controls a primary storage 106a. In one operation, suitable commands are issued to establish (block 504) a primary volume to secondary volume mirror between a primary volume of the primary storage 106a and a secondary volume of the secondary storage 106b. Accordingly, data sets 102 (FIG. 1A) written to the primary volume are copied, that is, mirrored, to the secondary volume. As data sets 102 are established on the primary volume and copied to the secondary volume, a data set record 300i (FIG. 3) including metadata 302-306 for the data set, is established on the primary and secondary volumes. As the metadata 302-306 is established for each data set 102, the selective write control logic 112a (FIG. 1B) identifies (block 508, FIG. 5) the areas of metadata on the primary volume and hence the secondary volume as well since the secondary volume contains a copy of both the data sets 102 and the metadata of the primary volume. Thus, for each data set, a metadata extent range may be identified, for example.

Within each identified area of metadata for a data set, such as within an metadata extent range, one or more fields may be designated (block 512) as a write operation acceptance area. As discussed above, one example of a possible write operation acceptance area is a last referenced date field 306 (FIG. 3) of a data set record $300_i$ for a particular data set 102 (FIG. 1A). It is appreciated that other fields of metadata or data sets may be designated as a write operation acceptance area, depending upon the particular application.

The designated metadata areas of the primary and secondary volumes are communicated (block 516) by the selective write control logic 112a (FIG. 5) of the primary storage control unit 100a, to the selective write control logic 112b of the secondary storage control unit 100b. In one embodiment, the write operation acceptance areas may be designated (block 512) and the selective write control logic 112b (FIG. 1B) of the secondary storage control unit 100b notified (block 516) as each data set and its associated metadata are established and copied to the secondary volume of the secondary storage 106b. In another embodiment, write operation acceptance area designation (block 512) and notification (block 516) may be triggered by an event such as when the secondary volume is configured for read only operations since there will be no additional data sets stored on the secondary volume until the secondary volume is reopened for additional write operations. It is appreciated that these operations may be triggered by other events, depending upon the particular application.

It is further appreciated that the metadata areas may change after the primary to secondary volume mirror is established. For example, data sets 102 (FIG. 1A) may be added to the primary volume and mirrored over to the secondary volume with accompanying metadata areas for the new data sets. Accordingly, in one embodiment, the metadata areas such as the metadata extent ranges, for example, may be monitored (block 520) by the selective write control logic 112a (FIG. 5) of the primary storage control unit 100a, for changes to the metadata extent range. For example, if the monitoring indicates that the metadata areas have been extended (block 524), the identified metadata areas may be updated (block 528) and the designated write operation acceptance areas may be updated (block 532) as well, and communicated (block 516) by the selective write control logic 112a (FIG. 5) of the primary storage control unit 100a, to the selective write control logic 112b of the secondary storage control unit 100*b* in accordance with changes to the metadata areas such as the metadata extent ranges. For example, the VTOC and VSAM Volume Data Set may be monitored for extensions to that metadata. In one embodiment, such monitoring may be implemented by appropriate modifications to suitable storage controller software such as Direct Access Device Space Management (DADSM), for example. If the VVDS or VTOC was extended, an updated CCHHR range (or other format) may be sent to the secondary through a subsequent establish command.

Monitoring (block 520) may continue. If no changes are detected such as an extension (block 524) of the metadata areas, the updates (block 528, 532) may be bypassed and monitoring (block 520) for changes continues.

Figure 6:
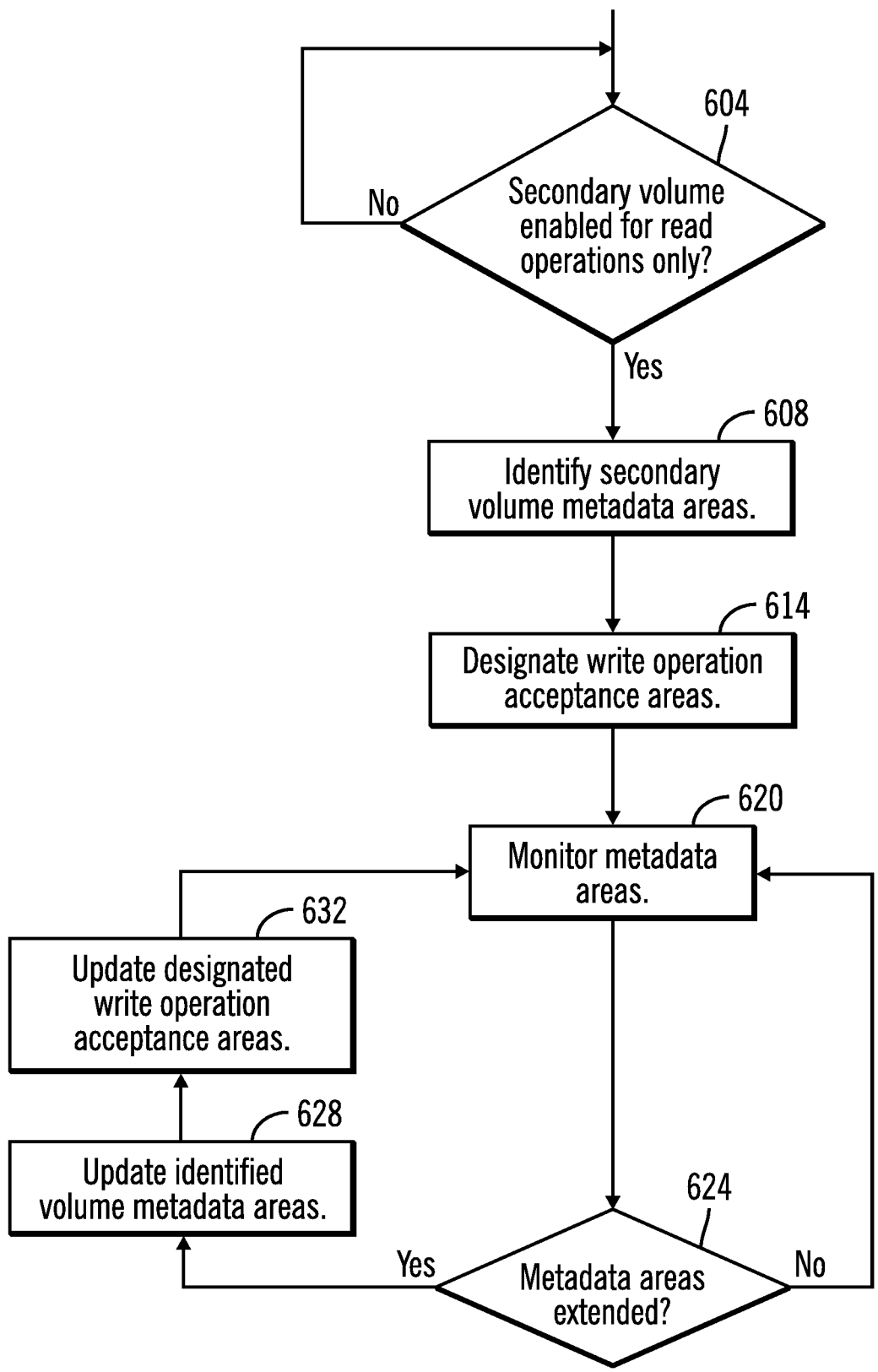
FIG. 6 illustrates still another embodiment of operations of a storage control unit employing selective write control in accordance with the present description.

FIG. 6 illustrates another embodiment of operations performed by a selective write control logic 112*b* (FIG. 1B) of a secondary storage control unit 100*b* in accordance with the present description. In this embodiment, a write operation acceptance area is designated in connection with operations of a secondary storage controller such as the secondary storage control unit 100*b* (FIG. 1B) which controls a secondary storage 106*b*. In this example, a primary volume to secondary volume mirror has already been established between a primary volume of the primary storage 106*a* and a secondary volume of the secondary storage 106*b*. Accordingly, data sets 102 (FIG. 1A) and the associated data set record 300*i* (FIG. 3) including metadata 302-306 for each such data set, have been mirrored, to the secondary volume.

In response to a triggering event such as the secondary volume being reconfigured for read operations only (block 604), the selective write control logic 112*b* (FIG. 1B) identifies (block 608, FIG. 6) the areas of metadata on the secondary volume since the secondary volume contains a copy of both the data sets 102 and the metadata of the primary volume. Thus, for each data set, a metadata extent range may be identified, for example. The metadata areas such as VTOC and VVDS may be identified by suitable system read utilities such as IEHLIST code, for example. Since metadata areas such as VTOC and VVDS typically do not have a last referenced field or open indicator for the VTOC or VVDS metadata itself, a read operation directed to the VTOC or VVDS metadata typically would not cause the generation of an associated write operation by the operating system. It is appreciated that these metadata identification operations may be triggered by other events, depending upon the particular application.

Within each identified area of metadata for a data set, such as within an metadata extent range, one or more fields may be designated (block 614) as a write operation acceptance area of the secondary volume. As discussed above, one example of a possible write operation acceptance area is a last referenced date field 306 (FIG. 3) of a data set record 300*i* for a particular data set 102 (FIG. 1A). It is appreciated that other fields of metadata or data sets may be designated as a write operation acceptance area, depending upon the particular application.

In this embodiment, since the selective write control logic 112*b* (FIG. 1B) of the storage control unit 100*b* designates (block 614) the write operation acceptance areas, the communication (block 516, FIG. 5) of designated write operation acceptance areas by the selective write control logic 112*a* (FIG. 1B) of the storage control unit 100*a* to the selective write control logic 112*b* (FIG. 1B) of the storage control unit 100*b*, may be bypassed in the embodiment of FIG. 6.

It is appreciated that the metadata areas may change after the primary to secondary volume mirror is established and the secondary volume has been configured for read operations only. For example, the secondary volume may be reconfigured to accept write operations. Accordingly, data sets 102 (FIG. 1A) may be added to the primary volume and mirrored over to the secondary volume with accompanying metadata areas for the new data sets. Accordingly, in one embodiment, the metadata areas such as the metadata extent ranges, for example, may be monitored (block 620) by the selective write control logic 112*b* (FIG. 6) of the secondary storage control unit 100*b*, for changes to the metadata extent range. For example, write operations directed to the VTOC or the VVDS metadata areas may be examined to determine if those areas are being extended. If the monitoring indicates that the metadata areas have been extended (block 624), the identified metadata areas may be updated (block 628) and the designated write operation acceptance areas may be updated (block 632) by the selective write control logic 112*b* (FIG. 6) of the primary storage control unit 100*b* in accordance with changes to the metadata areas such as the metadata extent ranges.

For example, if an extend to the metadata areas was detected, the additional range may be added to the identified metadata areas utilizing an establish command. In one embodiment, a write operation directed to an area designated for write operation acceptance, may cause the selective write control to generate an interrupt to the storage software on the secondary controller to evaluate the nature of the write operation to determine if the VTOC, VVDS or other designated metadata area is being extended.

Monitoring (block 620) may continue. If no changes are detected such as an extension (block 624) of the metadata areas, the updates (block 628, 632) may be bypassed and monitoring (block 620) for changes continues.

Figure 7:
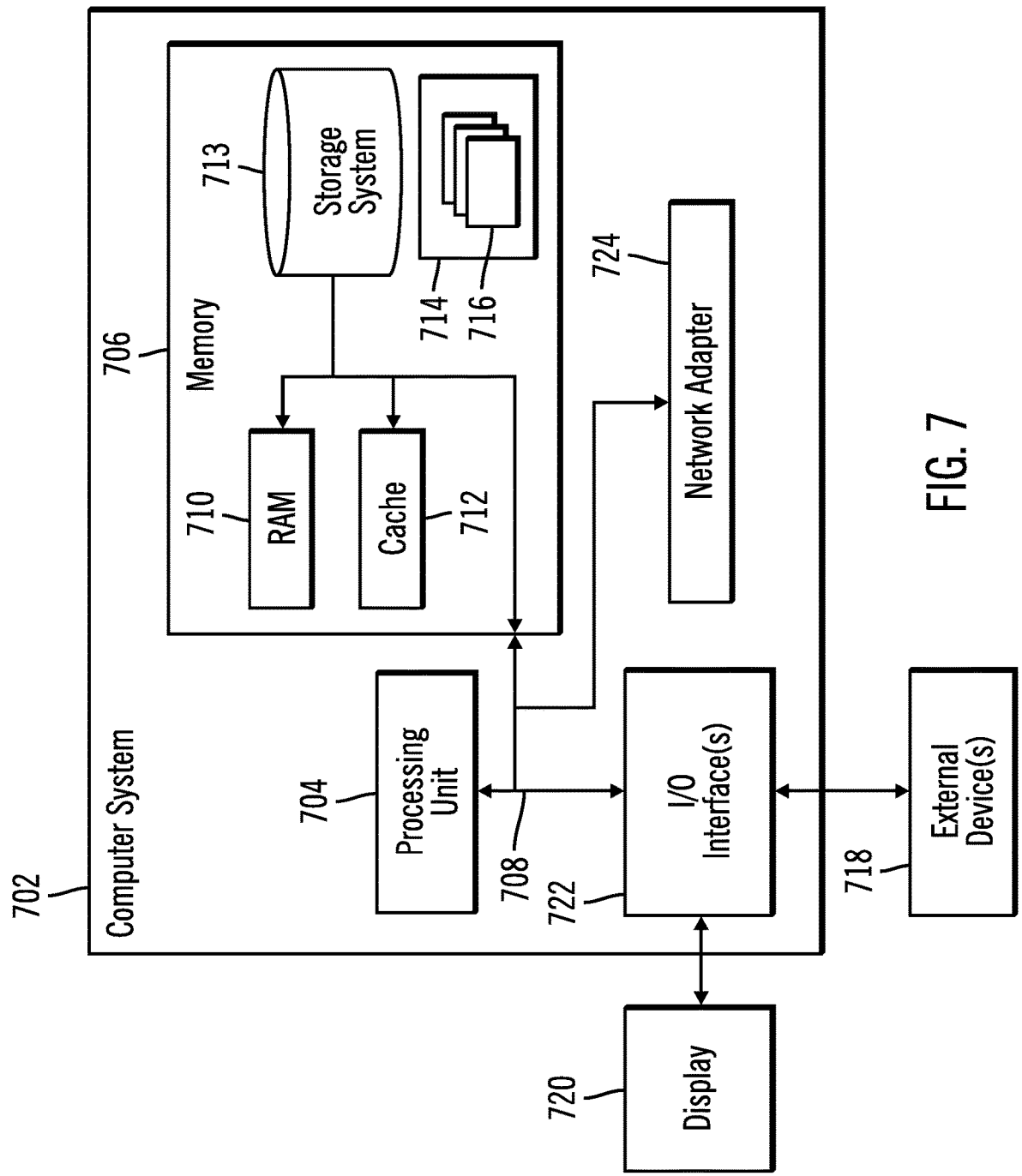
FIG. 7 illustrates a computing environment in which the components of FIGS. 1A, 1B may be implemented.

The computational components of FIGS. 1A, 1B, including the controller or control unit 100, 100*a*, 100*b*, may each be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIGS. 1A, 1B may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

It is appreciated that selective write control in accordance with one embodiment of the present description, permits a write operation which is associated with a read operation, to be selectively accepted and discarded if the write operation is directed to update a write operation acceptance area such as metadata associated with the target data set, for example. As a result, the read operation may be permitted to proceed and will not fail because the associated write operation was discarded rather than attempting to commit the write operation to the volume, thereby avoiding an error condition for a volume in which write operations have been disabled. Accordingly, applications which seek to perform read operations may be permitted to access data stored on such a volume.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising operations of a storage controller, the storage controller operations comprising:

accepting a write operation having write target data and associated with a read operation if a write target area of the write operation is determined to be within a designated write operation acceptance area; and discarding the accepted write operation to the write target area if write operations have been selectively disabled to prevent the write target data from being committed to the write target area while preserving existing data in the write target area and issuing a successful commitment message that the write operation to the write target area was successfully committed to the write target area notwithstanding that the accepted write operation was discarded to prevent the write target data from being committed to the write target area so that failure of the read operation is avoided by the discarding the accepted write operation and by the issuing the successful commitment message.

2. The method of claim 1 wherein the storage controller operations further comprise:

receiving from a host, the read operation associated with the write operation and directed to reading target data from a read target area of a storage unit coupled to the storage controller; and reading the read target data from the storage unit if the associated write operation is accepted.

3. The method of claim 2 wherein the designated write operation acceptance area includes metadata concerning the target data of the read operation.

4. The method of claim 3 wherein the read target data is a data set and write target data is directed to updating a last referenced date field of the metadata for the read target data set of the read operation so that discarding the write operation prevents updating the last referenced date field for the read target data set of the read operation.

5. The method of claim 2 wherein the operations further comprise:

rejecting both the read operation and the write operation if the write target area of the associated write operation is determined to be outside the designated write operation acceptance area; and issuing an error message indicating that the read target data of the rejected read operation was not read and the write target data of the rejected write operation was not committed to the write target area.

6. The method of claim 2 wherein the operations further comprise:

accepting both the read operation and the associated write operation if both read and write operations have been enabled for the storage unit;

committing the write target data of the accepted write operation to the write target area of the accepted write operation if write operations have been enabled for the storage unit; and reading the read target data of the accepted read operation from the read target area of the storage unit if read operations have been enabled for the storage unit.

7. The method of claim 2 wherein the storage unit is a secondary volume which is a mirror of a primary volume and wherein the storage controller operations further comprise:

identifying a metadata extent range of the secondary volume;

designating within an identified metadata extent range, a designated write operation acceptance area; and monitoring the metadata extent range for changes to the metadata extent range and updating the designated write operation acceptance area in accordance with changes to the metadata extent range.

8. The method of claim 2 wherein the storage unit is a secondary volume which is a mirror of a primary volume and wherein the method further comprises operations of a primary storage controller coupled to the primary volume, and wherein the operations of the primary storage controller comprise:

identifying a metadata extent range of the primary volume wherein the identified metadata extend range is mirrored on the secondary volume;

designating within an identified metadata extent range, a designated write operation acceptance area;

notifying the storage controller coupled to the secondary volume of the designated write operation acceptance area;

monitoring the identified metadata extent range for changes to the metadata extent range and updating the designated write operation acceptance area in accordance with changes to the metadata extent range; and notifying the storage controller coupled to the secondary volume of the updated designated write operation acceptance area.

9. A computer program product for a computing system having a host and a storage controller having a storage unit coupled to the storage controller, the product comprising at least one computer readable storage medium having computer readable program instructions embodied therewith, the program instructions executable by the storage controller to cause the storage controller to perform operations, the operations comprising:

accepting a write operation having write target data and associated with a read operation if a write target area of the write operation is determined to be within a designated write operation acceptance area; and discarding the accepted write operation to the write target area if write operations have been selectively disabled to prevent the write target data from being committed to the write target area while preserving existing data in the write target area and issuing a successful commitment message that the write operation to the write target area was successfully committed to the write target area notwithstanding that the accepted write operation was discarded to prevent the write target data from being committed to the write target area so that failure of the read operation is avoided by the discarding the accepted write operation and by the issuing the successful commitment message.

10. The computer program product of claim 9 wherein the storage unit is a secondary volume, the computing system further has a primary storage unit which has a primary volume, and the secondary volume is a mirror of a primary volume, and wherein the storage controller operations further comprise:

identifying a metadata extent range of the secondary volume;

designating within an identified metadata extent range, a designated write operation acceptance area; and monitoring the metadata extent range for changes to the metadata extent range and updating the designated write operation acceptance area in accordance with changes to the metadata extent range.

11. The computer program product of claim 9 wherein the storage unit is a secondary volume, the computing system further has a primary storage controller, a primary storage unit coupled to the primary storage controller, the primary storage unit has a primary volume, and the secondary volume is a mirror of a primary volume, and wherein the at least one computer readable storage medium has computer readable program instructions embodied therewith which are executable by the primary storage controller to cause the primary storage controller to perform operations, the primary storage controller operations comprising:

identifying a metadata extent range of the primary volume wherein the identified metadata extend range is mirrored on the secondary volume;

designating within an identified metadata extent range, a designated write operation acceptance area;

notifying the storage controller coupled to the secondary volume of the designated write operation acceptance area;

monitoring the identified metadata extent range for changes to the metadata extent range and updating the designated write operation acceptance area in accordance with changes to the metadata extent range; and notifying the storage controller coupled to the secondary volume of the updated designated write operation acceptance area.

12. The computer program product of claim 9 wherein the operations further comprise:

receiving from a host, the read operation associated with the write operation and directed to reading target data from a read target area of the storage unit coupled to the storage controller;

determining if the write target area of the write operation associated with the read operation is within the designated write operation acceptance area of the storage unit coupled to the storage controller if write operations to the storage unit have been disabled; and reading the read target data from the storage unit if the associated write operation is accepted.

13. The computer program product of claim 12 wherein the designated write operation acceptance area includes metadata concerning the target data of the read operation.

14. The computer program product of claim 13 wherein the read target data is a data set and write target data is directed to updating a last referenced date field of the metadata for the read target data set of the read operation so that discarding the write operation prevents updating the last referenced date field for the read target data set of the read operation.

15. The computer program product of claim 12 wherein the operations further comprise:

rejecting both the read operation and the write operation if the write target area of the associated write operation is determined to be outside the designated write operation acceptance area; and issuing an error message indicating that the read target data of the rejected read operation was not read and the write target data of the rejected write operation was not committed to the write target area.

16. The computer program product of claim 15 wherein the operations further comprise:

accepting both the read operation and the associated write operation if both read and write operations have been enabled for the storage unit;

committing the write target data of the accepted write operation to the write target area of the accepted write operation if write operations have been enabled for the storage unit; and reading the read target data of the accepted read operation from the read target area of the storage unit if read operations have been enabled for the storage unit.

17. A system for use with a host, comprising:

a storage controller having a plurality of storage units, each storage unit coupled to the storage controller, each storage unit having a designated write operation acceptance area and areas having data stored therein, each storage unit being configurable to disable write operations, and a computer program product for the storage controller, the product comprising at least one computer readable storage medium having computer readable program instructions embodied therewith, the program instructions executable by the storage controller to cause the storage controller to perform operations, the operations comprising:

accepting a write operation having write target data and associated with a read operation if a write target area of the write operation is determined to be within a designated write operation acceptance area; and discarding the accepted write operation to the write target area if write operations have been selectively disabled to prevent the write target data from being committed to the write target area while preserving existing data in the write target area and issuing a successful commitment message that the write operation to the write target area was successfully committed to the write target area notwithstanding that the accepted write operation was discarded to prevent the write target data from being committed to the write target area so that failure of the read operation is avoided by the discarding the accepted write operation and by the issuing the successful commitment message.

18. The system of claim 17 wherein the storage unit is a secondary volume, the system further has a primary storage unit which has a primary volume, and the secondary volume is a mirror of a primary volume, and wherein the storage controller operations further comprise:

identifying a metadata extent range of the secondary volume;

designating within an identified metadata extent range, a designated write operation acceptance area; and monitoring the metadata extent range for changes to the metadata extent range and updating the designated write operation acceptance area in accordance with changes to the metadata extent range.

19. The system of claim 17 wherein the storage unit is a secondary volume, the system further has a primary storage controller, a primary storage unit coupled to the primary storage controller, the primary storage unit has a primary volume, and the secondary volume is a mirror of a primary volume, and wherein the at least one computer readable storage medium has computer readable program instructions embodied therewith which are executable by the primary storage controller to cause the primary storage controller to perform operations, the primary storage controller operations comprising:

identifying a metadata extent range of the primary volume wherein the identified metadata extend range is mirrored on the secondary volume;

designating within an identified metadata extent range, a designated write operation acceptance area;

notifying the storage controller coupled to the secondary volume of the designated write operation acceptance area;

monitoring the identified metadata extent range for changes to the metadata extent range and updating the designated write operation acceptance area in accordance with changes to the metadata extent range; and notifying the storage controller coupled to the secondary volume of the updated designated write operation acceptance area.

20. The system of claim 17 wherein the operations further comprise:
  receiving from a host, the read operation associated with the write operation and directed to reading target data from a read target area of the storage unit coupled to the storage controller;
  determining if the write target area of the write operation associated with the read operation is within the designated write operation acceptance area of the storage unit coupled to the storage controller if write operations to the storage unit have been disabled; and
  reading the read target data from the storage unit if the associated write operation is accepted.

21. The system of claim 20 wherein the designated write operation acceptance area includes metadata concerning the target data of the read operation.

22. The system of claim 21 wherein the read target data is a data set and write target data is directed to updating a last referenced date field of the metadata for the read target data set of the read operation so that discarding the write operation prevents updating the last referenced date field for the read target data set of the read operation.

23. The system of claim 20 wherein the operations further comprise:
  rejecting both the read operation and the write operation if the write target area of the associated write operation is determined to be outside the designated write operation acceptance area; and
  issuing an error message indicating that the read target data of the rejected read operation was not read and the write target data of the rejected write operation was not committed to the write target area.

24. The system of claim 20 wherein the operations further comprise:
  accepting both the read operation and the associated write operation if both read and write operations have been enabled for the storage unit;
  committing the write target data of the accepted write operation to the write target area of the accepted write operation if write operations have been enabled for the storage unit; and
  reading the read target data of the accepted read operation from the read target area of the storage unit if read operations have been enabled for the storage unit.

* * * * *